United States Patent [19]
Arnoldt

[11] 4,352,003
[45] Sep. 28, 1982

[54] METHOD FOR POSITIONING AND SECURING COMPONENTS OF A WORKPIECE

[75] Inventor: Peter J. Arnoldt, Clairton, Pa.

[73] Assignee: Ductmate Industries, Inc., Pittsburgh, Pa.

[21] Appl. No.: 76,205

[22] Filed: Sep. 17, 1979

[51] Int. Cl.$^3$ .................. B23K 11/10; B23K 37/04
[52] U.S. Cl. ........................... 219/103; 219/91.2; 219/161; 228/49 R
[58] Field of Search .............. 219/56.1, 56.22, 86.24, 219/103, 158, 161, 91.2; 228/49 R; 29/281.5

[56] References Cited

U.S. PATENT DOCUMENTS

| | | | |
|---|---|---|---|
| 1,464,207 | 8/1923 | Ledwinka . | |
| 1,714,867 | 5/1929 | Gross . | |
| 2,441,438 | 5/1948 | Mulder . | |
| 2,473,633 | 6/1949 | Brown, Jr. . | |
| 2,504,753 | 4/1950 | Suydam, Jr. ............... | 219/56.22 |
| 2,535,946 | 12/1950 | Mulder . | |
| 2,787,700 | 4/1957 | Kalbow . | |
| 3,397,299 | 8/1968 | Ciranko . | |
| 3,553,419 | 1/1971 | Garver et al. ............... | 219/103 |
| 4,215,262 | 7/1980 | Brastow ..................... | 219/103 X |

FOREIGN PATENT DOCUMENTS 54-27183  9/1979  Japan ........................ 219/86.24

*Primary Examiner*—J. V. Truhe
*Assistant Examiner*—Keith E. George
*Attorney, Agent, or Firm*—Stanley J. Price, Jr.; John M. Adams

[57] ABSTRACT

A second workpiece component, such as a rectangular frame member, is positioned on a first workpiece component, such as the end of a rectangular duct. The first workpiece component is engaged by a clamp member secured to a frame so that the first workpiece component remains fixed relative to the frame. A positioning device, which is secured to a securing device such as a spot welder, is moved into abutting relation with the second workpiece component. The positioning device moves the second workpiece component to a preselected location on the first workpiece component while the securing device moves to a preselected location in overlying and underlying relation with the first and second workpiece components. In this position, the second workpiece component is secured to the first workpiece component at a preselected location. After the second workpiece component is secured to the first workpiece component, both the securing device and clamp device are disengaged from the workpiece and moved to another location along the workpiece where the clamp device is moved into engagement with the first workpece component. Thereafter, by means of the positioning device, the second workpiece component is moved to the preselected location on the first workpiece component and the securing device is moved to the preselected location on the second workpiece component. The securing device then secures the second workpiece component to the first workpiece component along the same axis of the second workpiece component.

7 Claims, 4 Drawing Figures

METHOD FOR POSITIONING AND SECURING COMPONENTS OF A WORKPIECE

BACKGROUND OF THE INVENTION

1. Field of the Invention

This invention relates to a method for positioning and securing components of a workpiece and more particularly to a method for positioning and securing a pair of workpiece components where one of the workpiece components is maintained in a predetermined spacial relation with another workpiece component while the workpiece components are secured to each other by welding or the like.

2. Description of the Prior Art

Devices for positioning workpiece components for securing the components in a preselected manner is well known in the art. For example, U.S. Pat. No. 2,787,700 illustrates and discloses a work feeding and positioning mechanism for feeding a part or component to two operative positions relative to a pair of welding electrodes. A carriage is reciprocated toward and away from the welding electrodes and includes a work holder for carrying a component to and accurately positioning the component between the electrodes for welding of a pair of contacts thereon. The work holder is mounted on the carriage for transverse movement thereof. The length of the transverse movement of the work holder on the carriage is adjustable whereby the work holder accurately locates the part successively in two positions while the two contacts are sequentially welded thereto in a predetermined spaced relation to each other.

U.S. Pat. No. 1,714,867 discloses a welding apparatus adapted for use in construction of sheet metal shells and particularly internally trussed sheet metal doors. The trussed sheet metal doors include a truss structure first welded to a back plate and the truss structure is welded to a front plate. The back plate is placed on a table between rails and the trussed structure is placed on top of the back plate. The rails are adjusted and secured by bolts to permit the door to be moved between the rails. A main feed mechanism positions the door in respect to the electrodes for the first spot welding operation. A lower electrode remains fixed while an upper electrode is manually operated to move into position relative to the lower electrode for forming the spot weld operation of the welding mechanism. The operation is sequential in that the sheet metal door members are first initially moved to a position with respect to the electrodes followed by the step of clamping the back plate and trussed structure together by the movement of the upper electrode in respect to the lower electrode. With the members in a predetermined position, a row of spot welds are made along the length of the door at a preselected distance from each other. After one row of spot welds are made, the door is moved to a position for making a second row of spot welds.

U.S. Pat. No. 1,464,207 discloses an assembling and welding jig for assembling and electrically welding the parts of automobile bodies. A positioning member is operable to position a cowl panel and hold it correctly positioned with reference to the framework of the jig and body frame members to which it is to be welded. The positioning member is arranged to be swung into and out of operative position to permit the removal of the body frame and cowl from the welding jig and the insertion of another body frame and cowl panel to be connected together.

While it has been suggested by the prior art devices to move a pair of components into a preselected positioning for fastening together as by welding or the like, the prior art devices require the components to be moved by a carrier type mechanism into a predetermined position relative to the welding machine that remains fixed relative to the components. Once the components are located in the predetermined position, the electrodes of the welding machine are moved into an operative position with respect to the components for welding. This arrangement is cumbersome and is not readily adaptable to welding and other fastening operations where movement of the welding machine from place to place to carry out the welding operation is required.

Portable spot welders are known, such as illustrated and described in U.S. Pat. Nos. 2,441,438 and 2,535,946. The spot welders disclosed in these patents are designed to be manually moved from place to place to perform spot welding operations. The portable spot welder includes a pair of electrodes or tongs in which welding tips are provided at the end of the tongs and are adapted to be pressed toward each other against the components of a workpiece disposed therebetween. A lower tong is fixed, and an upper tong is pivotally connected to a cap of the welder to be moved by a toggle mechanism into contact with one surface of the workpiece.

With the above described portable spot welding apparatus, the workpiece components must be initially positioned in a predetermined relationship to each other for spot welding. Generally, this is done manually and with the aid of clamps or other devices to secure the components together before they can be welded. Not only is this operation time consuming, but requires a number of operating personnel.

Therefore, there is a need for a method to position and secure the components of a workpiece by means of a fastening device such as a spot welder and the like where the fastening device is readily movable from place to place to provide for precise positioning of the components relative to the welding or fastening machine in an efficient manner that reduces the time for the fastening of the components to be made and the number of operating personnel to carry out the spot welding operation.

SUMMARY OF THE INVENTION

In accordance with the present invention, there is provided a method for positioning and securing the components of a workpiece which includes positioning a second workpiece component on a first workpiece component. The first workpiece component is engaged by a clamping means and a positioning means is moved into abutting relation with the second workpiece component. The positioning means and the second workpiece component are moved relative to the first workpiece component until the second workpiece component is positioned at a preselected location relative to the first workpiece component. Securing means is positioned in operative relation with the first and second workpiece components after the second workpiece component is positioned at the preselected location. The securing means then secures the second workpiece component to the first workpiece component at a preselected location on the second workpiece component.

The securing means, positioning means and second workpiece component are preferably simultaneously moved to a preselected position relative to the first workpiece component. The second workpiece component is urged by the positioning means toward the first workpiece component while the second workpiece component is being secured to the first workpiece component by the securing means.

In the preferred embodiment, the second workpiece component is maintained at the preselected location relative to the first workpiece component while the second workpiece component is secured to the first workpiece component. Also, the second workpiece component is secured to the first workpiece component preferably by spot welding the second workpiece to the workpiece component.

Accordingly, the principal object of the present invention is to provide a method for positioning and securing components of a workpiece where one component is maintained in a fixed predetermined position relative to a second workpiece component and the securing means is positioned in a preselected position relative to the workpiece.

Another object of the present invention is to provide a method of positioning and securing components of a workpiece in which the second component, the positioning means and the securing means are simultaneously moved relative to a workpiece first component while the workpiece first component is engaged by a clamping means.

These and other objects of the present invention will be more completely disclosed and described in the following specification, the accompanying drawings and the appended claims.

DESCRIPTION OF THE PREFERRED EMBODIMENT

Figure 1:
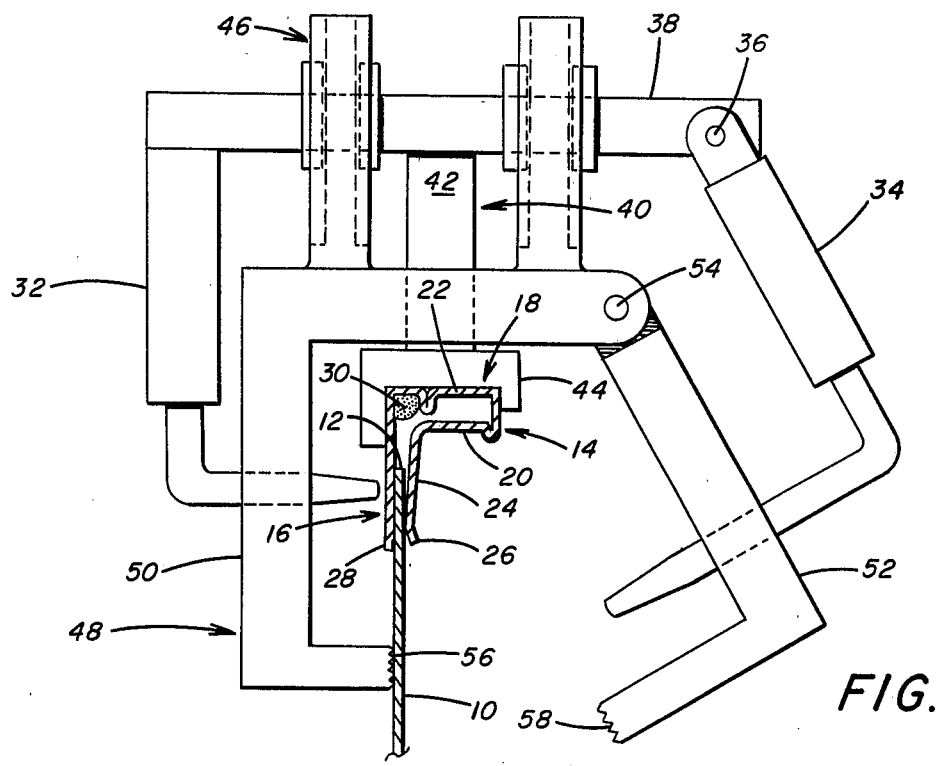
FIG. 1 is a schematic illustration of the second workpiece component positioned on the first workpiece component with the positioning means abutting the second workpiece component and portions of the clamping means and securing means spaced from the workpiece.

In copending application Ser. No. 933,179 entitled "A Flange Type Duct Joint Assembly And Seal Arrangement Therefor", there is described apparatus for securing a frame member to the end portions of a sheet metal duct. FIGS. 1-4 illustrate the method and apparatus for securing the frame members to the end portions of a duct. It should be understood, however, that the hereinafter described method may be utilized to secure other workpiece components to each other where it is desired to secure the components at a preselected location on one or both of the components.

The ducts are generally rectangular and one side of the duct is illustrated in section and designated by the numeral 10. The duct 10 has an end portion 12. The frame member generally designated by numeral 14 is also generally rectangular and has the same dimensions as the duct 10. The frame member 14 has four connected legs with a flange type configuration in section that includes a duct receiving leg portion 16 and an upstanding channel shaped leg portion 18. The upstanding channel shaped leg portion 18 includes a front wall 20 and a rear wall 22 spaced from the front wall 20 to provide an opening therebetween. The duct receiving leg portion 16 includes an inclined top wall 24 with an upturned lip end portion 26 and a bottom wall 28. The top and bottom walls 24 and 28 are arranged to receive the duct end portion 12 therebetween. Preferably, a deformable flowing type gasket material 30 is positioned in the flange portion of frame member 14 abutting the channel shaped leg portion front wall 22 and the duct receiving leg portion bottom wall 28.

The duct end portion 12 is inserted in the frame member duct receiving leg portion 16 so that the duct end portion 12 abuts the channel shaped leg portion front wall 22 to partially displace the deformable gasket material 30 inside the leg portions 16 and 18. In this manner, the gasket material 30 flows into sealing relation around the duct portion edge 12 in the duct receiving leg portion 16.

Figure 4:
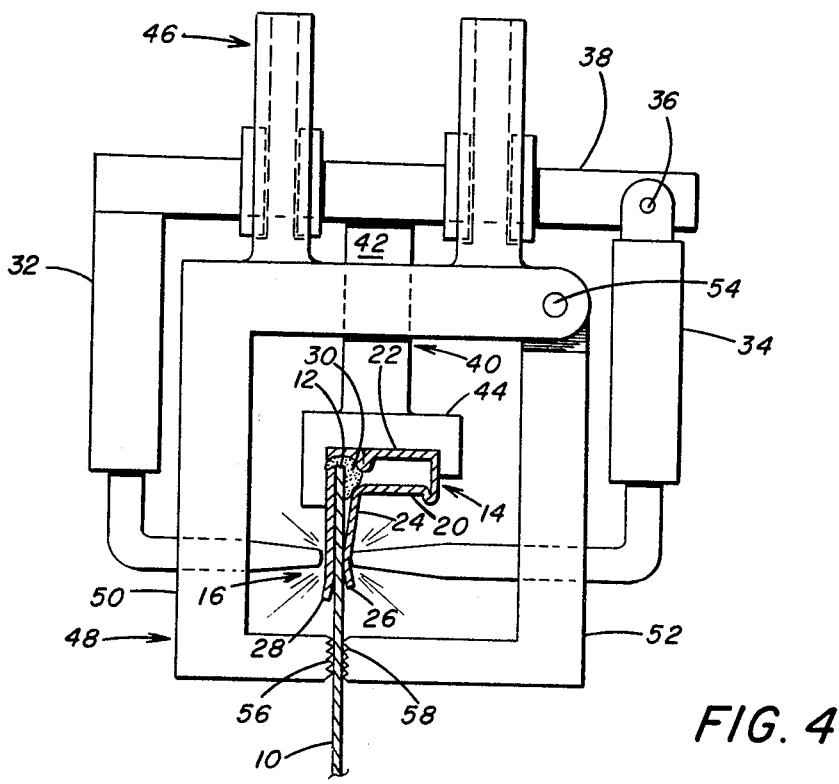
FIG. 4 is a view similar to FIG. 1 illustrating the first workpiece component being engaged by the clamping means and the second workpiece component being urged toward the first workpiece component while the securing means secures the workpiece components to each other at a preselected location on the workpiece.

As illustrated in FIG. 4, the frame member 14 is secured to the duct 10 by spot welding the duct receiving leg portion walls 24 and 28 to the duct 10 at a location where the duct upper wall 24 abuts the surface of the duct 10 adjacent the upturned portion 26. In securing the frame 14 to the duct 10 a plurality of spot welds such as a row of spot welds are made longitudinally along the frame 14 at the location where the duct receiving leg inclined wall 24 abuts the surface of the duct 10.

The ends of a pair of sheet metal ducts each having a frame member 14 secured thereto are secured to each other by connecting the upstanding flange portions 18 and corner pieces of the frame of one sheet metal duct section to mating flange portions and corner pieces of a frame secured together by the thus formed frame members in a manner to provide an air-tight seal between the ends of the duct sections and the frame members. To insure that the edge portions of the duct end portion remains in abutting relation with the front wall 22 of the channel shaped leg portion 18 to maintain an air-tight seal between the duct end portion 12 and the channel shaped leg portion front wall 20, the flange duct receiving leg portion 16 is rigidly secured by spot welding to the duct.

Each spot weld is precisely located at a predetermined location along the flange portion 14. Each spot weld is located on the duct receiving leg portion top wall 24 a preselected distance from the channel shaped leg portion rear wall 22. The spot welds are preferably located at a location adjacent the upturned lip portion 26 of the duct receiving leg portion top wall 24 where adjacent surfaces of the top wall 24, the duct end portion and the duct receiving leg portion bottom wall 28 are in abutting relation. The spot weld located at this position provides a weld where all the metal surfaces are in electrical contact and eliminates any air gaps between the metal surfaces.

FIGS. 1-4 illustrate schematically apparatus for positioning the frame 14 relative to the duct 10 and securing the frame 14 to the duct by means of a spot weld. A securing device such as a welding machine has a pair of welding tongs 32 and 34. The welding tong 32 is fixed relative to the machine and the welding tong 34 is pivotally connected as by pivot 36 to the welding machine frame generally indicated by the numeral 38. When the workpiece components 10 and 14 are being moved into position, the welding tong 34 is pivoted about pivot 36 and is widely spaced from the tong 32. When the components 10 and 12 are in the desired position relative to each other and relative to the tong 32, the tong 34 is pivoted toward tong 32 and the tips of the tongs 32 and 34 engage the surfaces of the frame legs 24 and 28.

A ram or positioning member generally designated by the numeral 40 has an arm member 42 secured to the welding machine 38 and extending forwardly therefrom. Secured to the end of the front end of the arm 42 is a generally channel shaped member 44 in which the upstanding channel shaped leg portion 18 of frame member 14 is positioned. The positioning member 40 is secured to the welding machine 38 and both the positioning member 40 and welding machine 38 are arranged to move longitudinally relative to the duct member 10 on a suitable guide means of a frame member generally designated by the numeral 46.

The frame member 46 has a clamping device generally designated by the numeral 48 with a lower clamping arm 50 which is fixedly secured to the frame member 46 and a second clamping arm 52 that is pivoted at 54 on the frame member 46. The clamp arms 50 and 52 have inturned end portions 56 and 58 which are arranged to abut the surfaces of the duct 10 and engage the duct 10 to fixedly position the duct 10 relative to the frame 46.

With this arrangement, the frame 46 remains stationary and the clamping device secured to and extending from the frame 46 remains fixed also. The welding machine 38 and the positioning device 40 are movable longitudinally relative to the frame 46 toward and away from the duct 10.

The frame members 14 are secured to the ends of the duct 10 in the following manner. The frame members 14 are positioned on the duct member 10 with the duct end portion 12 extending between the walls 24 and 28. The entire frame 14 is positioned on the rectangular duct 10 and the apparatus is moved into a position similar to FIG. 1 where the lower clamp arm 50 has its inturned edge 56 in abutting relation with the duct 10. The upper clamp arm 52 is then pivoted toward the upper surface of duct 10 until the end portion 58 is in abutting relation with the duct 10. The clamp 46 thus fixedly secures the duct to the apparatus and prevents movement of the duct 10 relative to the frame 46.

Suitable actuating means then moves the welding machine 38 and the positioning means 40 downwardly so that the portion 44 of positioning means 40 engages the channel shaped leg portion 18 of frame 14 and moves the frame downwardly on the duct 10 until the duct end portion 12 penetrates the gasket material 30 and abuts the vertical wall 22. Since the positioning means 40 is connected to the welding machine 38, the tongs 32 and 34 of the welding machine 38 move simultaneously with the positioning device 40. A preselected pressure is exerted on the welding machine 38 to continuously urge the frame 14 toward the duct 10. After the frame 14 has reached the position illustrated in FIG. 3, the tong 34 is pivoted toward the tong 32 so that the tips of the tongs 32 and 34 are in abutting relation with the walls 24 and 28 of frame 14.

While the positioning device 40 is being urged downwardly toward the duct 10, the welding machine 38 forms a spot weld at a location on the frame where the duct receiving inclined wall 24 abuts the duct 10 adjacent the upturned end portion 26. As previously discussed, at this location both walls 24 of frame 14 are in abutting relation with the surfaces of duct 10.

Figure 2:
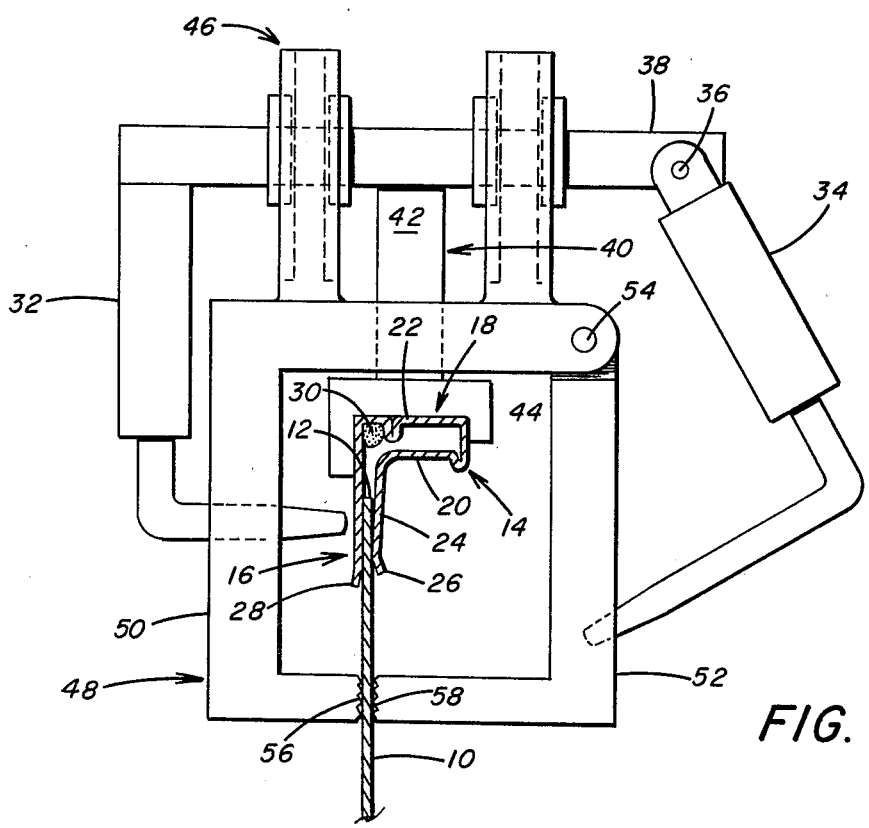
FIG. 2 is a view similar to FIG. 1 illustrating the first workpiece component engaged by the clamping means prior to the positioning means moving the second workpiece component toward the first workpiece component.
Figure 3:
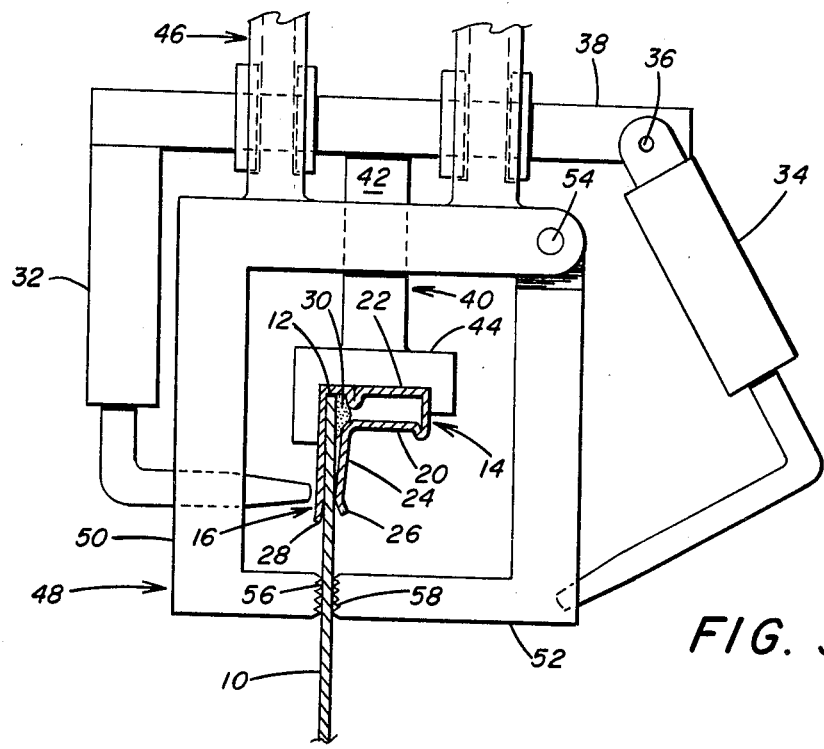
FIG. 3 is a view similar to FIG. 1 illustrating the first workpiece component being engaged by the clamping means and the positioning means urging the second workpiece component on the first workpiece component and the simultaneous movement of the securing device to a preselected position relative to the workpiece.

After the spot weld is made at that location, both the clamp arm 52 and the tong 34 are pivoted to the position illustrated in FIG. 1 and the welding machine 38 and positioning member 40 are moved rearwardly on the frame 46 to the position illustrated in FIG. 1. The apparatus is then moved to another location on the duct and the clamp members 50 and 52 are moved into engagement with the duct 10 as illustrated in FIG. 2. Thereafter, the frame 14 is positioned by means of positioning device 40 and the movement of the welding machine on the frame 46 to the position illustrated in FIG. 3 and the welding tong 34 is moved into the position illustrated in FIG. 4 to form another spot weld on the frame 14. With this arrangement, a plurality of spot welds are formed on the frame in a row at the same dimensional location from the frame channel shaped upstanding portion wall 22.

Thus with the above described method, the frame 14 is moved into the same position along the periphery of the duct by the positioning device 40 and the support welds are made at the same distance from the frame wall 22.

It should be understood that other types of fastening devices other than a spot welding machine may be employed to secure the first and second components of a workpiece to each other by the above described method.

An application Ser. No. 76,270 filed Sept. 17, 1979 and entitled "Apparatus For Positioning And Securing Components Of A Workpiece" by the same inventor and assigned to the same assignee describes in detail suitable apparatus for performing the above described method. The detailed description of the copending application is incorporated herein by reference.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. The method for positioning and securing components of a workpiece comprising, positioning a second workpiece component on a first workpiece component relative to a fixed frame, engaging said first workpiece component by clamp means positioned on said fixed frame, supporting a welding machine for movement relative to said fixed frame toward and away from said second workpiece component, moving said welding machine to move a positioning means into abutting relation with said second workpiece component and move said second workpiece component relative to said first workpiece component until said second workpiece component is positioned at a preselected location relative to said first workpiece component, moving opposed electrodes relative to said positioning means on said welding machine into abutting relation with said workpiece first and second components after the second workpiece component is positioned at said preselected location, and passing welding current between said opposed electrodes through said first and second workpiece components to secure said second workpiece component to said first workpiece component at a preselected location on said second workpiece component.

2. The method for positioning and securing components of a workpiece as set forth in claim 1 which includes, simultaneously moving said opposed electrodes, positioning means and second workpiece component to a preselected position relative to said first workpiece component.

3. The method for positioning and securing components of a workpiece as set forth in claim 1 which includes, urging said second workpiece component by said positioning means towards said first workpiece component and thereafter welding said second workpiece component to said first workpiece component.

4. The method for positioning and securing components of a workpiece as set forth in claim 1 which includes, maintaining said second workpiece component at said preselected location relative to said first workpiece component while welding said second workpiece component to said first workpiece component.

5. The method for positioning and securing components of a workpiece as set forth in claim 1 which includes, maintaining said first workpiece component engaged by said clamping means while said second workpiece component is being welded to said first workpiece component by said opposed electrodes.

6. The method for positioning and securing components of a workpiece as set forth in claim 1 which includes, maintaining said first workpiece component engaged by said clamping means and urging said second workpiece component toward said first workpiece component while said opposed electrodes weld said second workpiece component to said first workpiece component.

7. The method for positioning and securing components of a workpiece as set forth in claim 1 which includes, moving said second workpiece component on said first workpiece component by said positioning means and maintaining a preselected distance between a portion of said second workpiece component abutting said positioning means and said opposed electrodes while welding said second workpiece component to said first workpiece component.

* * * * *